Aug. 27, 1957  D. H. BARBOUR ET AL  2,804,339

INJECTION NOZZLE

Filed March 30, 1955

INVENTORS
DANIEL H. BARBOUR
ALBERT HOFFMAN, JR

BY Richard S. Shreve
ATTORNEY

United States Patent Office 2,804,339
Patented Aug. 27, 1957

2,804,339

INJECTION NOZZLE

Daniel H. Barbour and Albert Hoffman, Jr., Niagara Falls, N. Y., assignors to Union Carbide Corporation, a corporation of New York Application March 30, 1955, Serial No. 498,073

2 Claims. (Cl. 299—107)

This invention relates to a nozzle for effecting the introduction of fluids into a reactive medium, and more particularly to a nozzle for effecting the injection of a stream of molten material at substantially high temperature and at substantially high velocity, into a reactive medium.

The metallurgical industry has long sought a practicable means of producing refractory metals, particularly those high melting point refractory metals of groups IV, V and VI of the periodic table, many of which are reducible only with difficulty. Ordinary metallurgical procedures are not applicable to most of these metals and special techniques have been evolved for procuring the elements in metallic form. The currently proposed processes are generally based upon reduction of the refractory metal halide by one of the metals of the alkali or alkaline earth metal groups, since the latter have a greater affinity for halogens than is generally true of the refractory metals. These reduction processes are usually highly exothermic and therefore rather difficult to control.

The increasing industrial demand for these metals has been responsible for increased efforts to find a commercially feasible method for their production. One of the paramount problems faced is that of introducing the reactants to each other.

Many major difficulties are encountered in feeding fluids into reactive media. This is particularly true when such reactions are conducted at elevated temperatures, when solid products are formed as a result of the reaction, where safety is a consideration, or where the reaction is exothermic. Agitation is of course required in order to assure proper contact between the reactants, but agitation also presents serious problems. Continuous mixing of the reactants is necessary since segregation of one or the other results in large irregularities in the rate of heat evolution, and should large quantities suddenly come into contact with each other, the very large amount of heat suddenly evolved might severely damage the reaction chamber, either by virtue of the great increase in temperature or pressure that may ensue.

Another difficulty which may arise is due to the reaction occurring between the vapors of the reactants, the solid products of the reaction then being deposited on the upper walls of the reactor and more particularly around any openings through which either of the reactants may be introduced into the reaction chamber. Should such openings become closed over as a result of such deposition of solid material, it becomes impossible to continue the operation unless some special devices are provided for removing such obstructions without the necessity of opening the reactor.

As an example of a reaction having the difficulties and problems enumerated, the reduction of refractory metals from their halides by a molten reducing metal may be cited. Selecting as a specific example that of the reduction of chlorides of titanium to titanium metal by a molten reducing metal such as sodium metal or magnesium metal, these problems are immediately apparent.

The necessary agitation, for reasons of both contact between the reactants and safety, cannot be achieved by mechanical means since it is impractical to operate and lubricate bearings at high temperatures in the presence of corrosive materials, and a long unsupported shaft with an impeller at its extended end will not operate satisfactorily, since at high temperatures the shaft loses much of its rigidity and the impeller will not remain in its proper location within the reaction vessel. Attempts to use such mechanical devices to provide agitation within the reacting mass have resulted in the puncturing of the wall of the reaction vessel when the shaft became bent and whipped around within the enclosure. Also, deposition of solid products of the reaction dynamically unbalance the rotor and add to the difficulties of its use. Further, there is a tendency for the reduced metal to form on the sides of the reaction chamber, necessitating a difficult and costly removal.

The objects of the present invention are therefore to avoid the difficulties referred to above, to effect the introduction of fluid at high temperature and high velocity into a reactive medium in a cohesive uninterrupted stream, to minmize vaporization of the material from the stream, to effect self-cooling, to effect complete and ultimate mixing of the reactants, and to minimize the possibility of deposition of solid reaction products on the end of the nozzle and thus avoid interference with the flow of the injected liquid.

The invention by means of which the objects herein are achieved comprises a special nozzle structure for injecting a reducible refractory metal halide or alkali or alkaline earth metal in the liquid state into a molten reducing metal at high velocity into a reactor where reaction takes place to produce the high melting point refractory metal in elemental form. Preferably the reactant with the higher boiling point, and consequent lower vapor pressure-temperature relationship is first placed in the reactor and the other reactant injected through the nozzle.

In order to produce the desired result, the nozzle must have certain characteristics and meet certain rigid requirements. These requirements will be described herewith.

In order to reduce the possibility of vapor-phase reactions, it is essential that the stream of reactant thus injected should remain as a coherent body of liquid and should not separate into discrete droplets at any time during its passage from the nozzle to the surface of the reactant bath in the bottom of the chamber.

As is well known in the art, fluids flow through tubular containers in two distinct and characteristic manners. In one case, called "viscous flow," the velocity of the liquid is substantially uniform throughout its cross-sectional area, except immediately adjacent to the walls of the tubular container where the velocity is gradually reduced to an extremely low value at the contact surface between the fluid and the tube. In the other case, turbulence occurs within the liquid and the velocity is nowhere uniform within the body of the liquid. It has been established that the difference between viscous or streamline flow and turbulent flow is dependent upon the mean velocity of the liquid, the diameter of the tube, the specific gravity and the absolute viscosity of the liquid. A formula developed by Reynolds relates these factors as follows:

$$\frac{VDs}{u}$$

When these quantities are expressed in c. g. s. units and the value obtained from the calculation is less than about 2,000, in general, streamlined or viscous flow occurs.

When the value exceeds 2,000, turbulent flow may usually be expected. It is essential, of course, that this criterion be taken into account in designing a nozzle for the instant application, since streamline flow is essential to production of a coherent stream of injected liquid.

The design of the nozzle must be such as to prevent deflection of the injected stream of reactant by deposition of solid products of the reaction. Prevention of accumulation of solid reaction products on the nozzle is achieved in large measure by regulating the temperature of the nozzle. It has been found that if the nozzle can be kept cool, the quantity of material thus deposited is greatly reduced. However, water cooling is completely impractical for safety reasons. The minutest leak would not only so contaminate the metallic product as to make it useless, but it would react with the alkali or alkaline earth metal with possibly disastrous results. It is necessary, therefore, that the nozzle be designed so as to be cooled by the material going through it. In addition, since the deposition of solid products, even under the best of circumstances cannot be entirely prevented, it is necessary that the configuration of the nozzle be such that interference of such deposits with the coherence of the liquid stream be entirely eliminated.

The accompanying drawing is a schematic representation of an embodiment of the invention whereby the objects of the invention may be achieved.

Figure 1:
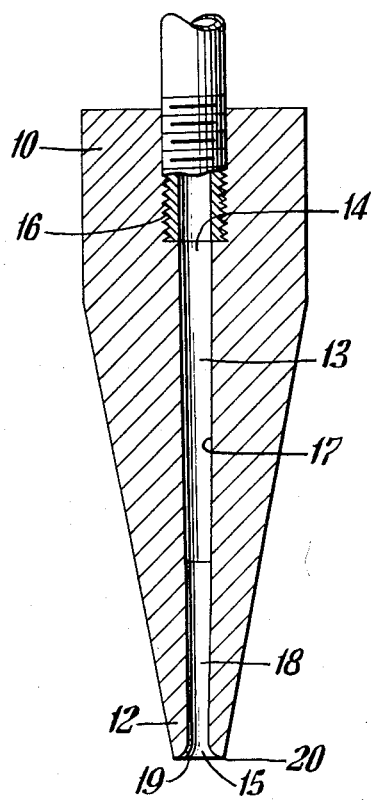
Fig. 1 is a sectional side view of a nozzle according to the invention.

The nozzle of the invention comprises an elongated body prepared from any metal possessing suitable corrosion resistance under the operating conditions. The body has an inlet end 10 and an outlet end 12, and a substantially straight longitudinal bore 13 therethrough forming an inlet port 14 at the inlet end 10 and an exit port 15 at the outlet end 12. The inlet end 10 is adapted in any suitable manner, for example by threads 16, to communicate with a fluid supply. The bore 13 through the nozzle has a smoothly reduced taper 17 from the inlet port 14 to a point about two-thirds the length of the bore from the inlet port 14. The remainder of the bore 18 has a substantially constant diameter and terminates at the exit port 15 in an outwardly flaring portion 19 of constantly increasing cross-sectional area. The external portion of the nozzle tapers smoothly from the inlet end 10 towards the outlet end 12 to a relatively thin wall thickness, so that the liquid flowing through the nozzle keeps the tip relatively cool. The tapered outer wall terminates so as to form a junction 20 with the outwardly flaring portion 19 of the longitudinal bore 13.

This cooling effect is further enhanced by the interior configuration, which is such as to maintain a relatively thin wall thickness throughout the nozzle. In order to eliminate any turbulent flow which may be introduced by the change in diameter from the feed pipe to the nozzle and within the nozzle, the tip section is prepared with a bore of uniform diameter. For satisfactory results, it is necessary that the ratio of the length of this cylindrical bore section to the diameter be within certain limits and, in accordance with the formula previously expressed, for the particular liquid and injection velocity, the dimensions of the nozzle bore at the tip must be such that when inserted into the formula together with the other required quantities, a Reynolds number of less than 2,000 will be obtained. The relationship between the diameter of the nozzle opening and the length of the cylindrical section is believed to be related to the time required for the cessation of turbulent flow and the establishment of viscous flow, and it is further believed that this may be related to the viscosity of the liquid and, of course, the velocity of its passage through the nozzle. Obviously, the greater the velocity and ease of disturbance of flow pattern within the liquid, the longer the cylindrical portion of the tip must be. Although some reasonably satisfactory results have been obtained with the length to diameter ratios as low as 1, the preferred range is 5 to 20.

Figure 2:
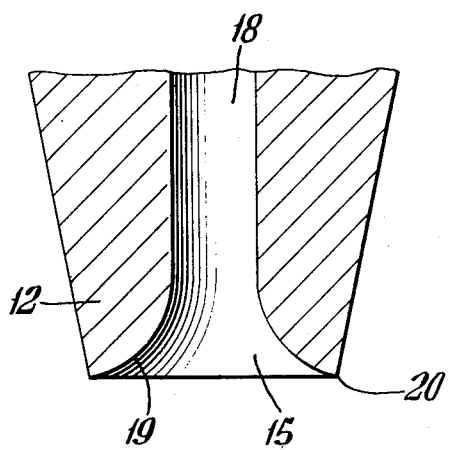
Fig. 2 is an enlargement of the exit port shown in Fig. 1.

The design of the exit end of the nozzle throat is also of some importance, and this design is shown in detail in an enlarged form in Fig. 2. It is necessary that the design at the exit end of the nozzle throat be such that there is a clean breaking away of the liquid stream from the body of the nozzle with little or no tendency to separate droplets from the stream or to accumulate liquid on the outer surface of the nozzle body. The square-cut design shown in the Fig 2 has been found to be preferable. The width of the face at the tip of the nozzle, however, is kept to a very small dimension in order to provide no foothold for the accumulation of solid products of the reaction.

By use of the nozzle of the invention the difficulties and problems in producing refractory metals as heretofore set forth are satisfactorily eliminated. Using the example of the reduction of titanium tetrachloride to titanium metal by a molten reducing metal, the reaction is carried out in a suitable chamber closed at both ends, preferably with its longitudinal axis vertical, into the bottom of which an appropriate charge of reducing metal is placed. Extending through the upper cover of the chamber is the nozzle of the invention through which titanium chloride is introduced into the chamber and into the molten reducing metal. The reaction is preferably carried out in an inert atmosphere.

The reaction is initiated by heating the reducing metal to a temperature sufficient to liquefy it, and then introducing the liquid titanium tetrachloride at high velocity by means of the nozzle of the invention so that the liquid is injected into substantially the central portion of the body of molten metal and becomes immediately and intimately mixed therewith and at least partially reduced, before any appreciable vaporization occurs. The nozzle of the invention permits the stream of titanium tetrachloride to be so directed that impingement occurs within the central portion of the mass of molten reducing metal and the heat generated by the reaction is dissipated throughout the mass, thus making it possible to regulate the temperature of the system and control the rate of reaction. If, for instance, the stream of titanium tetrachloride enters the molten metal adjacent to the wall of the chamber, the high-temperature zone would create a hot spot in the wall of the chamber, causing failure thereof, or at least promoting alloying of the titanium metal with the metal of the chamber.

Since it is extremely difficult to completely prevent at least some vaporization of the reactants, and consequently reaction at the chamber surfaces, some deposition of solid products may occur at the exit end of the nozzle, tending to deflect the stream of titanium tetrachloride. The possibility of this occurring is materially reduced by the use of the nozzle of the invention. The wall thickness at the exit end of the nozzle is relatively very thin, but not a knife edge, and the taper of the external conical surface is such that should a deposit build up in that surface, there is very little likelihood that it will extend into and deflect the stream of titanium tetrachloride issuing from the nozzle. Further, in the event that such deflection should occur, the nozzle is preferably mounted flexibly so that it may be repositioned so that the stream of titanium tetrachloride will impinge on the reducing metal within the desired zone.

One of the most important advantages of the use of the high velocity stream according to the method of the invention lies in its great superiority over agitation by mechanical means. When a liquid in a relatively narrow stream is impinged at relatively high velocity onto the surface of a fluid reactant, a rotating motion around a horizontal circular axis is set up, resulting in an immediate, intimate mixing that substantially constantly offers contact between the reactants so brought together. In effect, such a means of adding one reactant to another results in the bringing together of the reactants in such a manner and at such a rate so as to be reacted immediately upon their contact with each other. A further advantage resulting in such a means of effecting the reaction is that the rotating motion set up within the reactant mass tends to cause formation of the reduced metal as a compact sponge suspended in the central portion of the molten fluid which greatly facilitates removal of the reactive products from the reaction vessel. Also, since very little reaction occurs outside the main mass of molten metal and metallic chlorides, the metal reduced during the reaction is protected from contamination by either the reaction vessel or vapors within the space above the reacting mass, and metal of unusual purity is obtained.

The invention has been used for injecting titanium tetrachloride, tantalum pentachloride, and sodium metal into reactors of various sizes, and has proved eminently satisfactory in operation and free of clogging difficulties.

For example, titanium tetrachloride was injected through the nozzle at feed rates of 120 pounds per hour for the first 10%, 180 pounds per hour from 10 to 20% and 240 pounds per hour for the remainder of the run period. The reaction proceeded smoothly, and temperature distribution was uniform. The nozzle had a 0.047 inch internal diameter. At the end of the run, the nozzle was found to be clean and free of interfering deposits.

Typical nozzles that have been successfully employed for the above-stated purposes and which embody the principle of the invention are described in the following examples.

EXAMPLE I

In a relatively small capacity reaction system, two sizes of nozzles were used under varying conditions with completely satisfactory performance. Table I presents the pertinent information.

Table I

| Bore Dia., In. | Bore Length, In. | Ratio, l./d. | Injection Feed Rate | | | |
|---|---|---|---|---|---|---|
| | | | lb./min. | | feet/sec. | |
| | | | max. | min. | max. | min. |
| 0.046 | 0.75 | 16.3 | 4 | 2 | 54.4 | 27.2 |
| 0.046 | 0.75 | 16.3 | 5 | 2 | 67.7 | 27.2 |
| 0.055 | 0.75 | 13.6 | 5 | 2 | 46.5 | 18.6 |

EXAMPLE II

In another operation on a somewhat larger scale, nozzles of the same design but having slightly different dimensions were employed with satisfactory results. The pertinent data are presented in Table II.

Table II

| Bore Dia., In. | Bore Length, In. | Ratio, l./d. | Injection Feed Rate | | | |
|---|---|---|---|---|---|---|
| | | | lb./min. | | feet/sec. | |
| | | | max. | min. | max. | min. |
| 0.086 | 0.75 | 8.7 | 16 | 6 | 61.2 | 23.0 |
| 0.076 | 0.75 | 9.9 | 10 | 4 | 49 | 19.6 |
| 0.076 | 0.75 | 9.9 | 19.5 | 8 | 95.5 | 39.2 |

EXAMPLE III

In still another operation, nozzles of the invention but of large internal diameter were used, as shown in Table III.

Table III

| Bore Dia., In. | Bore Length, In. | Ratio, l./d. | Injection Feed Rate | | | |
|---|---|---|---|---|---|---|
| | | | lb./min. | | feet/sec. | |
| | | | max. | avg. | max. | avg. |
| 0.111 | 0.75 | 6.75 | 28 | 19 | 65 | 44 |
| 0.116 | 0.75 | 6.48 | 36 | 27 | 76 | 57 |
| 0.111 | 0.75 | 6.75 | 44 | 27 | 102 | 62.6 |
| 0.1285 | 0.75 | 5.83 | 48 | 27 | 83 | 46.7 |
| 0.1285 | 0.75 | 5.83 | 56 | 40.5 | 100 | 72.4 |

EXAMPLE IV

In another series of operations, employing a normally solid, high-melting reactive metal halide, the latter was injected, in the melted state, through a nozzle of the invention. The temperature of the halide was somewhat in excess of 200° C. The ability of the nozzle to adjust itself to the temperature of the injected material was of considerable importance in this application since it avoided freezing of the injected halide within the nozzle. Details of the operating conditions are given in Table IV.

Table IV

| Bore Dia., In. | Bore Length, In. | Ratio, l./d. | Injection Feed Rate | |
|---|---|---|---|---|
| | | | lb./min. avg. | ft./min. avg. |
| 0.072 | 0.75 | 10.4 | 1.55 | 2.1 |
| 0.072 | 0.75 | 10.4 | 1.04 | 1.4 |
| 0.072 | 0.75 | 10.4 | 0.625 | 0.85 |

EXAMPLE V

In an operation where the molten reducing metal was injected into the reactor, a nozzle of the invention was employed. The molten metal was not filtered and some plugging occurred during the test, but aside from this, the operation was satisfactory. Details are given in Table V.

Table V

| Bore Dia., In. | Bore Length, In. | Ratio, l./d. | Injection Feed Rate | | | |
|---|---|---|---|---|---|---|
| | | | lb./min. | | feet/sec. | |
| | | | max. | min. | max. | min. |
| 0.052 | 0.75 | 14.2 | 10 | 0.5 | 166 | 1 |

We claim:

1. A nozzle for delivering fluids of reactive molten material and injecting them into a reactor in a viscous flow at substantially high temperatures and at substantially high velocities, comprising an elongated body constructed of rigid corrosion resistant metal capable of withstanding said high temperatures and velocities and having inlet and outlet ends, a substantially straight longitudinal bore therethrough forming an inlet port at said inlet end and an exit port at said outlet end, said inlet end being adapted to communicate with means for supplying said reactive molten fluids to said inlet port, said bore having a smoothly reduced taper from said inlet port to a point about two-thirds the length of said bore from said inlet port, the remainder of said bore having a substantially constant diameter and terminating at said exit port in an outwardly flaring portion of constantly increasing cross-sectional area, the ratio of the length of said taper to the length of said constant diameter producing viscous flow in a continuous uninterrupted stream to effect self-cooling of the nozzle and complete and ultimate mixing of the reactants, and the external portion of said nozzle tapering smoothly from said inlet end towards said outlet end and terminating so as to form a junction with said outwardly flaring portions of said bore to prevent deposition of solid products of the reaction and consequent deflection of the injected stream.

2. A nozzle for injecting reactive molten materials into a reactor in viscous flow at substantially high temperatures and at substantially high velocities, comprising an elongated body of rigid corrosion resistant metal capable of withstanding said high temperatures and velocities and having inlet and outlet ends, a longitudinal bore therethrough forming an inlet port at the inlet end and an exit port at the outlet end, said inlet end being adapted to be connected to a conduit for supplying said reactive molten material to said inlet port, said bore having a smoothly reduced taper from said inlet port to about two thirds of its length, the remainder of said bore being cylindrical and terminating at said exit port in an outwardly flaring portion of constantly increasing cross sectional area to prevent deposition of solid products of the reaction and consequent deflection of the injected stream, the ratio of the length of said taper to the length of said constant diameter producing viscous flow in a continuous uninterrupted stream to effect self-cooling of the nozzle and complete and ultimate mixing of the reactants, and the outside of said body tapering smoothly from near said inlet end toward the outlet end and terminating in a junction with said outwardly flaring portion of said bore, the ratio of the length of the cylindrical portion to the diameter of the nozzle opening being between 5 and 20.

References Cited in the file of this patent

UNITED STATES PATENTS

| 1,046,043 | Weintraub | Dec. 3, 1912 |
| 1,662,600 | Cox et al. | Mar. 13, 1928 |
| 2,722,442 | Sudduth | Nov. 1, 1955 |